United States Patent
Grimmer

(10) Patent No.: US 12,211,108 B2
(45) Date of Patent: Jan. 28, 2025

(54) APPARATUS AND METHOD FOR SHORT VIDEO INTERACTION/INTRODUCTION

(71) Applicant: Lori Grimmer, Silverton, OR (US)

(72) Inventor: Lori Grimmer, Silverton, OR (US)

(*) Notice: Subject to any disclaimer, the term of this patent is extended or adjusted under 35 U.S.C. 154(b) by 0 days.

(21) Appl. No.: 17/940,938

(22) Filed: Sep. 8, 2022

(65) Prior Publication Data

US 2024/0087053 A1    Mar. 14, 2024

Related U.S. Application Data

(60) Provisional application No. 63/242,151, filed on Sep. 9, 2021.

(51) Int. Cl.
*G06Q 50/00* (2024.01)

(52) U.S. Cl.
CPC .................. *G06Q 50/01* (2013.01)

(58) Field of Classification Search
CPC .............. G06Q 50/01; G06Q 10/10
See application file for complete search history.

(56) References Cited

U.S. PATENT DOCUMENTS

| | | | | |
|---|---|---|---|---|
| 10,334,397 B2 * | 6/2019 | Alharayeri | ............. | H04W 4/21 |
| 2011/0252340 A1 | 10/2011 | Thomas | | |
| 2013/0238707 A1 | 9/2013 | Yoshigaki et al. | | |
| 2013/0238708 A1 * | 9/2013 | Bustamente | ........ | H04L 63/0421 |
| | | | | 709/204 |
| 2016/0212230 A1 | 7/2016 | Schneider et al. | | |
| 2020/0273136 A1 * | 8/2020 | Li | .......................... | G06Q 50/01 |

OTHER PUBLICATIONS

International Search Report and Written Opinion, PCT/US2022/043003, dated Feb. 7, 2023, by International Searching Authority.

* cited by examiner

*Primary Examiner* — Michael E Teitelbaum
(74) *Attorney, Agent, or Firm* — Bamert Regan PLLC

(57) ABSTRACT

A system and method for conducting a short duration interactive video introduction session between a requesting user and an unknown person of interest is provided. One embodiment receives a user request to conduct a short duration interactive video introduction with the unknown person of interest who is a member of a social media site, communicates a short duration interactive video introduction invitation with a selectable link to an electronic device of the unknown person of interest, communicatively couples the electronic device of the requesting user and the electronic device of the unknown person of interest in response to receiving an acceptance of the short duration interactive video introduction invitation by the unknown person of interest, conducts the short duration interactive video introduction between the requesting user and the unknown person of interest, and ends the short duration interactive video introduction session upon expiration of a predefined duration.

18 Claims, 5 Drawing Sheets

APPARATUS AND METHOD FOR SHORT VIDEO INTERACTION/INTRODUCTION

PRIORITY CLAIM

This application claims priority to U.S. Provisional Application, Ser. No. 63/242,151, filed on Sep. 9, 2021, entitled Systems and Methods For Apparatus and Method for Short video Interaction/Introduction, which is hereby incorporated by reference in its entirety for all purposes.

BACKGROUND OF THE INVENTION

Social media sites are becoming very prevalent in our society. Such social media sites provide a platform where people may virtually gather for interactive conversations, storytelling, and sharing information, videos and/or pictures. Often, a user of a social media site will identify a person of interest whom they do not know. For example, the user may be a busy corporate executive who has limited time, or even no time, for an introductory conversation. And, it may be difficult to arrange an introductory conversation with the busy executive in view of the executive's time constraints, especially in the current pandemic wherein many people are virtually working from home.

However, many social media sites have no practical way for the user to meet and get to know an unknown person of interest without reaching out and "friending" that person. Such initial contact with an unknown person of interest may present a potential risk to the user of the social media site. Accordingly, the user may be reluctant to attempt to get to know the unknown person of interest.

The process of deciding whether to initially contact an unknown person of interest becomes even more important to the user when the social media site is a dating site for singles, an activity site that facilitates various group activities, a business community, or the like. The process of initially contacting the unknown person of interest using the social media site's messaging system, and the attendant back and forth exchange of textual messages, can be very time consuming. With interactive social media sites available today, such initial sessions can potentially last for an uncomfortably long duration of time, even as much as an hour or more. There is a need in the arts to alleviate the pressure of a long-winded session.

For example, on a dating social media site, the back and forth messaging can take several days or even weeks before the parties agree to meet for a first date. In such situations, the user may be subject to eventual disappointment because of this conversation duration required for the exchange of textual messages and/or later phone conversations before a first date occurs. Further, there is the opportunity for the unknown person of interest to exaggerate their qualities, or even lie about their qualities, in a series of textual messages. And, because of the potential for eventual in-person meetings between the user and the unknown person of interest, the user of the social media site needs to be very cautious in getting to know other members of the social media site for reasons of safety.

Accordingly, in the social media site platform arts, there is a need in the arts for improved methods, apparatus, and systems for facilitating introduction processes for social media site users.

SUMMARY OF THE INVENTION

Embodiments of the short duration interactive video introduction system provide a system and method for conducting a short duration interactive video introduction session between a requesting user and an unknown person of interest. One embodiment receives a user request from the requesting user to conduct a short duration interactive video introduction with the unknown person of interest who is a member of a social media site, communicates a short duration interactive video introduction invitation with a selectable link to an electronic device of the unknown person of interest, communicatively couples the electronic device of the requesting user and the electronic device of the unknown person of interest in response to receiving an acceptance of the short duration interactive video introduction invitation by the unknown person of interest, conducts the short duration interactive video introduction between the requesting user and the unknown person of interest, and ends the short duration interactive video introduction session upon expiration of a predefined duration.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
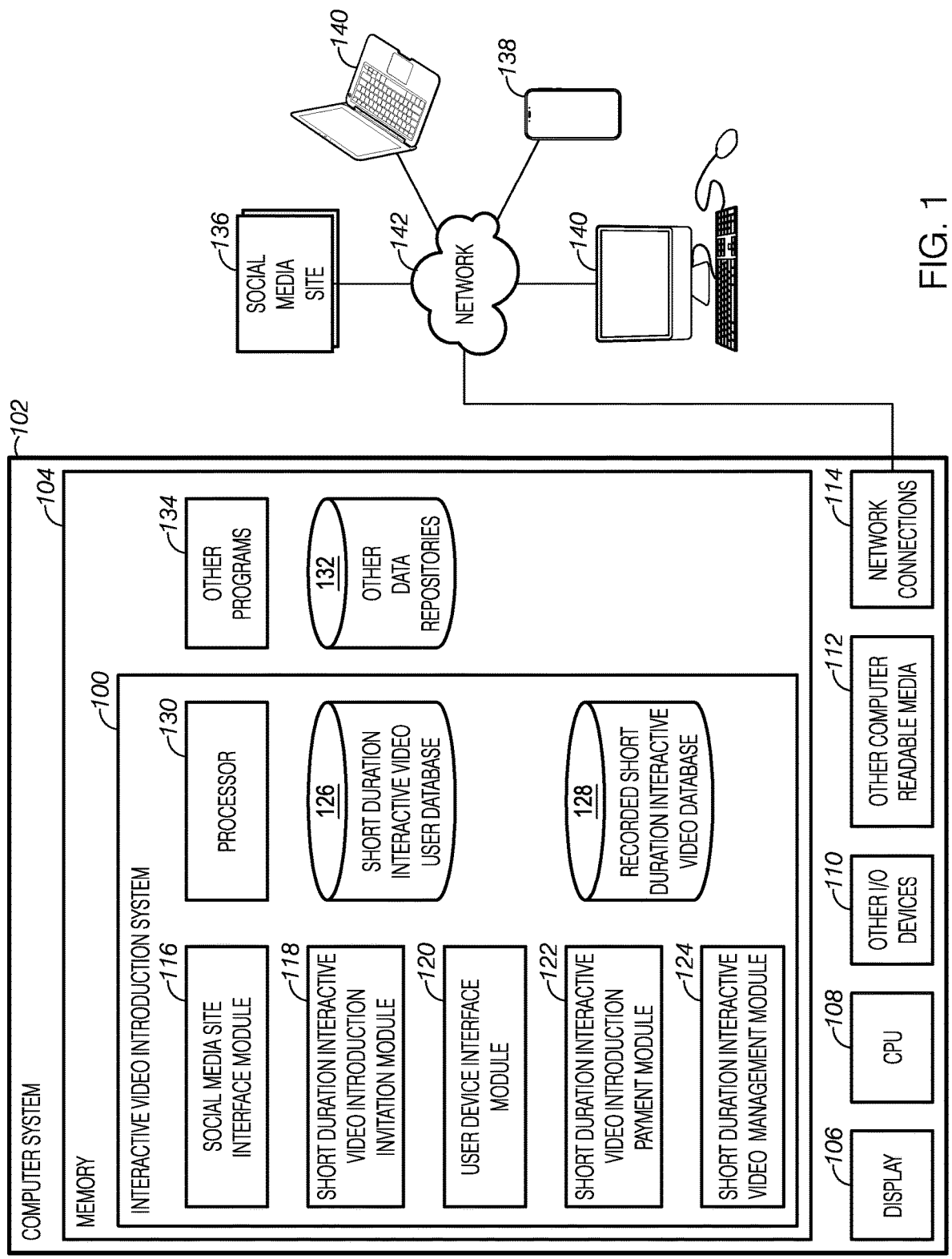
FIG. 1 is a block diagram of a first embodiment of an introductory video clip system.

FIG. 1 is a block diagram of a short duration interactive video introduction system 100. Embodiments of the short duration interactive video introduction system 100 are operable to provide a short duration (a short period of time) interactive video introduction between an unknown person of interest and a requesting user that is time limited by a predefined time or duration limit. In practice, the requesting user identifies the unknown person of interest while using a participating social media site. Here, the user may be browsing profiles or searching profiles on a particular social media site platform. When an unknown person of interest is identified, embodiments of the short duration interactive video introduction system 100 provide a method and apparatus for a time-limited short duration interactive video introduction session between a requesting user and an unknown person of interest. An initial short duration interactive video introduction is conducted for a short period of time (duration), preferably a few seconds such as thirty second or the like. For some requesting users who are visual learners, the time-limited short duration interactive video introduction session will give the requesting user the opportunity to view and hear someone in the present, and that short duration is enough to decide whether the relationship goes further. Any suitable video conferencing system and method now known or later developed may be used by the various embodiments of the short duration interactive video introduction system 100. All such embodiments are intended to be included within the scope of this disclosure and to be protected by the accompanying claims.

For example, the user may be interested in finding a potential dating partner on a dating related social media site. The user, browsing through social media site member profiles, may view the profile of an unknown person of interest. Alternatively, or additionally, the social media site may suggest one or more site members that might be of interest based on the profile and/or searching attributes of the user. The user appreciates that a time-limited, short duration interactive video introduction will give them a sense of the character and other attributes of the unknown person of interest. Accordingly, the short duration interactive video introduction may help the user to decide whether to further expend their time and effort in developing a potential dating relationship with the unknown person of interest.

As another example, the user may be interested in finding a potential business associate having a specific skill set that one or more members of a social media site may have, particularly when the social media site relates to businesses and/or business related contact networking. Here, the user may search for members having a specified skill set, a specified industry, a specified company, a specified educational background, a specified educational institution, etc. Alternatively, or additionally, the social media site may suggest one or more site members that might be of interest based on the profile and/or searching attributes of the user. Here, the short duration interactive video introduction may help the user to decide whether to further expend their time and effort in developing a potential business relationship with the unknown person of interest.

The electronic device of the user, in response to identifying a social media site member that the user wishes to initially contact, generates a user request message that corresponds to the user's request to conduct a short duration interactive video introduction to the unknown person of interest. The generated user request message for a short duration interactive video introduction with the unknown person of interest is communicated to the short duration interactive video introduction system 100. One skilled in the art appreciates that this initially generated and communicated user request message is not the same as a link, or a message with a link, wherein the link establishes communication connectivity between two electronic devices. Rather, the user request message is a message indicating the user's interest in initiating the time-limited short duration interactive video introduction process.

Preferably, a non-limiting example user request message consists of user identity information (first identity information) that identifies the requesting user, unknown person of interest identity information (second identity information) that identifies the unknown person of interest (using their name, member alias, or the like), social media site identity information that identifies the social media site, and electronic device information that identifies the electronic device and/or the type of electronic device being used by the requesting user. Supplemental information may also be included in the user request message. For example, information associated with the requesting user's social media site profile may be included in the user request.

Embodiments of the short duration interactive video introduction system 100 then generate at least one short duration interactive video introduction invitation for a short duration interactive video introduction. The short duration interactive video introduction invitation identifies the requesting user based on the user identify information. The short duration interactive video introduction invitation is directed to the unknown person of interest based on the social media site information and based on the unknown person of interest identify information. The selectable link is generated based on the electronic device information.

The generated short duration interactive video introduction invitation is then communicated to an electronic device associated with the unknown person of interest. Graphical information (interchangeably referred to herein as a short duration interactive video introduction invitation graphic) corresponding to the short duration interactive video introduction invitation is then presented on an electronic device being used by the unknown person of interest. Preferably, the presented graphical information includes information identifying the requesting user and a hotspot graphical icon that may be selected by the unknown person of interest to accept the short duration interactive video introduction invitation. The unknown person of interest may then accept the short duration interactive video introduction invitation, deny or ignore the short duration interactive video introduction invitation, or propose a time for a future scheduled short duration interactive video introduction.

Some embodiments of the short duration interactive video introduction system 100 may be configured to selectively generate and communicate a plurality of different formatted short duration interactive video introduction invitations that are communicated to different types of electronic devices. For example, a first short duration interactive video introduction may be communicated to the identified social media site platform using a first communication format. The social media site platform may then present the first short duration interactive video introduction invitation on a webpage currently being viewed by the unknown person of interest, wherein selection of the presented link (interchangeably referred to herein as a selectable link) will initiate a connection process between the devices of the user and the unknown person of interest.

Another example short duration interactive video introduction invitation may be formatted as a text message that is communicated to a smartphone of the unknown person of interest (using a second communication format that is different from the first communication format). The text message may prompt the unknown person of interest to log into the social media site. Or, the text may include a link that opens a short duration interactive video introduction webpage at the social media site. Alternatively, the link may initiate a video conversation between the electronic device being used by the unknown person of interest and the electronic device being used by the requesting user.

Another short duration interactive video introduction invitation may be formatted as an email message (using another communication format that is different from the first communication format). The email message may contain information identifying the requesting user, the social media site, and/or the requesting user's profile information. Depending upon the type of electronic device being used by the unknown person of interest, the email message may optionally contain a link that initiates a video conversation between the device of the unknown person of interest and a device of the requesting user. Alternatively, or additionally, a link embedded within the email message may open up a webpage of the social media site that is configured to facilitate the short duration interactive video introduction between the requesting user and the unknown person of interest.

Yet another formatted short duration interactive video introduction invitation may be sent directly to an electronic device of the identified social media site platform that has one or modules of the short duration interactive video introduction system 100 integrated into the platform software. In such applications, the social media site platform may have one or more logic modules that support video conversations between social media site members. The short duration interactive video introduction invitation generated by a module of the short duration interactive video introduction system 100 may be presented on a webpage of the social media site, or as a specific time-limited short duration interactive video introduction webpage. The short duration interactive video introduction invitation informs the unknown person of interest that the requesting user is interested in conducting a short duration interactive video introduction. In response to acceptance of the invitation by the unknown person of interest, the social media site platform may use their proprietary video conversation feature to present the short duration interactive video introduction on the electronic devices of the requesting user and the unknown person of interest. One or modules of the short duration interactive video introduction system 100 integrated into the social media site platform programming then manages the short duration interactive video introduction in accordance with the various features disclosed herein.

In the various embodiments of the short duration interactive video introduction system 100, if the initial short duration interactive video introduction goes well for the user, the requesting user may wish to further establish a potential relationship with the unknown person of interest. For example, the requesting user's initial perception of the unknown person of interest during the initial short duration interactive video introduction may indicate to the requesting user that the unknown person of interest may be a potential suitable dating partner or business associate. Here, during the short duration interactive video introduction, the user may make a request to extend the limited time of the ongoing short duration interactive video introduction (wherein the ongoing short duration interactive video introduction continues for another time limited period if the unknown person of interest accepts the interactive video continuation request). Alternatively, the requesting user may use the social media site platform to further establish a relationship with the unknown person of interest using features of that particular social media site platform.

Conversely, if the initial short duration interactive video introduction does not go well for the user, the requesting user may not wish to further establish a potential relationship with the unknown person of interest. Here, the requesting user allows the short duration interactive video introduction system 100 to end the ongoing short duration interactive video introduction when the time limit of the short duration interactive video introduction expires (or, the requesting user may immediately end the short duration interactive video introduction at any time if the requesting user so chooses). In such situations, the short duration interactive video introduction system 100 automatically terminates the short duration interactive video introduction so that the requesting user does not need to feel or experience any social awkwardness because of their choice to end the short duration interactive video introduction. Some embodiments of the short duration interactive video introduction system 100 may present a confirmation button, hotspot or the like to the requesting user at the conclusion of the short duration interactive video introduction session to confirm that the requesting user wishes to end the short duration interactive video introduction session.

Also of note, the unknown person of interest is also interactively involved as an active participant of the short duration interactive video introduction. If the initial short duration interactive video introduction goes well for the unknown person of interest, then the unknown person of interest may make a request to extend the limited time of the ongoing short duration interactive video introduction. If the initial short duration interactive video introduction does not go well for the unknown person of interest, then the unknown person of interest may end the ongoing short duration interactive video introduction when the time limit of the short duration interactive video introduction expires (or immediately if the unknown person of interest so chooses). Here, the short duration interactive video introduction system 100 automatically terminates the short duration interactive video introduction so that the unknown person of interest does not need to feel or experience any social awkwardness because of their choice to end the short duration interactive video introduction. Similarly, some embodiments of the short duration interactive video introduction system 100 may present a confirmation button, hotspot or the like to the unknown person of interest at the conclusion of the short duration interactive video introduction session to confirm that the unknown person of interest wishes to end the short duration interactive video introduction session.

In the various embodiments of the short duration interactive video introduction system 100, an initial short duration interactive video introduction has a predefined time period (time duration), such as a thirty second duration. A preferred embodiment provides for a sixty second short duration interactive video introduction (by using a thirty second time extension) or a ninety second short duration interactive video introduction (by using a sixty second time extension or a second thirty second time extension). Any suitable time period may be used by the various embodiments of the short duration interactive video introduction system 100. Some embodiments may employ a maximum duration for any short duration interactive video introduction, such as, but not limited to, five minutes. Clients (the requesting user and/or the unknown person of interest) may sign up for a subscription service provided by a provider organization that manages the short duration interactive video introduction system 100. As part of the subscription service, the client may subscribe to various initial time durations, various time extension durations, and/or maximum time durations.

Some embodiments of the short duration interactive video introduction system 100 may be configured to selectively generate and communicate a selected one of a plurality of different short duration interactive video introduction invitations that are communicated to the electronic device of the unknown person of interest. For example, a first time-limited short duration interactive video introduction invitation may be communicated to the electronic device of the unknown person of interest in response to the requesting user selecting a first time duration that defines a first time-limited period for that short duration interactive video introduction. Here, if the invitation associated with the first time period is accepted by the unknown person of interest, the short duration interactive video introduction system 100 will manage a short duration interactive video introduction that is limited to the first time period.

Alternatively, the requesting user may select a second short duration interactive video introduction invitation that is associated with a different second time period. For example, the requesting user may select a sixty second duration or a ninety second duration for the initial short duration interactive video introduction invitation. Any suitable duration choice may be provided by the various embodiments of the short duration interactive video introduction system 100. Here, if the invitation associated with the second time period is accepted, the short duration interactive video introduction system 100 will manage a short duration interactive video introduction that is limited to the second time period. In some embodiments, a plurality of different time-limited periods may be selectable by the requesting user.

Similarly, duration of time extensions of a continuation of the time-limited short duration interactive video introduction may be provided to the requesting user and/or the unknown person of interest. The requesting user and/or the unknown person of interest may select the interactive video continuation request during, or at the end of, the short duration interactive video introduction so that the short duration interactive video introduction system 100 does not automatically terminate the ongoing short duration interactive video introduction at the expiration of the current time duration.

Preferably, at least one of the selectable time periods requires payment of a fee by the requesting user. Various pricing values for various selectable time durations may be provided by embodiments of the short duration interactive video introduction system 100. In some embodiments, a first short duration initial short duration interactive video introduction may be provided to the requesting user free of any charges. If the requesting user and/or the unknown person of interest wish to have one or more subsequent short duration interactive video introduction sessions, and/or wish to extend an ongoing short duration interactive video introduction, the requesting user and/or the unknown person of interest may be required to pay an access fee or the like prior to receiving further short duration interactive video introductions and/or extending the short duration interactive video introduction by another time duration.

In the various embodiments of the short duration interactive video introduction system 100, in response to the unknown person of interest accepting the short duration interactive video introduction invitation, then the short duration interactive video introduction system 100 initiates and manages a time-limited short duration interactive video introduction between the requesting user and the unknown person of interest. If the unknown person of interest denies or ignores the presented short duration interactive video introduction invitation, then the short duration interactive video introduction system 100 reports this result back to the requesting user so that the requesting user understands that the unknown person of interest has declined (not accepted) the invitation.

In some instances, the unknown person of interest may propose a future date and time for a future short duration interactive video introduction, embodiments report the proposal to the requesting user. If the proposal is acceptable to the requesting user, embodiments of the short duration interactive video introduction system 100 provide a confirmation message to the unknown person of interest. Then, the short duration interactive video introduction system 100 initiates the short duration interactive video introduction between the requesting user and the unknown person of interest at the scheduled date and time.

The disclosed systems and methods for the short duration interactive video introduction system 100 will become better understood through review of the following detailed description in conjunction with the figures. The detailed description and figures provide examples of the various inventions described herein. Those skilled in the art will understand that the disclosed examples may be varied, modified, and altered without departing from the scope of the inventions described herein. Many variations are contemplated for different applications and design considerations, however, for the sake of brevity, each and every contemplated variation is not individually described in the following detailed description.

Throughout the following detailed description, a variety of examples for systems and methods for the short duration interactive video introduction system 100 are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, elements or method steps not expressly recited.

Terms such as "first", "second", and "third" are used to distinguish or identify various members of a group, or the like, and are not intended to denote a serial, chronological, or numerical limitation.

"Coupled" means connected, either permanently or releasably, whether directly or indirectly through intervening components. "Secured to" means directly connected without intervening components.

"Communicatively coupled" means that an electronic device exchanges information with another electronic device, either wirelessly or with a wire based connector, whether directly or indirectly through a communication network 108. "Controllably coupled" means that an electronic device controls operation of another electronic device.

A "social media site" is a web site that enables a plurality of site members to interact with each other. Typically, a social media site is based upon one or more themes, such as business interests, dating interests, hobby interests, etc. Site members typically provide profile information and an optional image of themselves that is viewable by other members of that social media site.

A "social media site platform" is the electronic device and/or system that enables the social media site. The social media site platform enables connectivity to electronic devices of the site members, such as, but not limited to, the smartphones, cell phones, laptops, personal computers, desktop computers, notebooks, or other personal computing devices now known or later developed. The social media site platform manages presentation of member profile information to the site members, manages communications between site members, stores profile information, stores communications between site members, and performs other functions as needed.

A "hyperlink" (interchangeably referred to herein as a "link") is reference data that establishes communication connectivity between an electronic device being used by a requesting user and another target electronic device or system, such as the electronic device being used by the unknown person of interest. In response to a selection of a link that is presented on a display of the electronic device that is being used by the requesting user and/or the unknown person of interest, the electronic device establishes a communication link to the target electronic device. Once the user's electronic device becomes communicatively coupled to the target electronic device/system, then a variety of interactions between the user's electronic device and the target electronic device/system may occur. As another example, the link may present a webpage in response to selection of the link. The webpage may be provided by the social media site. Alternatively, the webpage may be provided by a server managing the short duration interactive video introduction system 100.

A "time-limited short duration interactive video introduction" (interchangeably referred to herein as an "short duration interactive video introduction" or an "short duration interactive video introduction session") is a time-limited video conference conducted between a requesting user and an unknown person of interest. A predefined time duration is associated with each time-limited short duration interactive video introduction. The time duration starts when the video conference between the requesting user and the unknown person of interest begins. The short duration interactive video introduction invitation concludes (is automatically terminated) by the short duration interactive video introduction system 100 upon the expiration of the predefined time duration (unless an interactive video continuation request is implemented).

A "user request message" (interchangeably referred to herein as a "user request") is a communication of information from an electronic device used by a requesting user, of a component of the electronic device being used by the requesting user, which corresponds to a request for a short duration interactive video introduction with an unknown person of interest. A user request does not include a link.

FIG. 1 is a block diagram of an example computing system 102 that may be used to practice embodiments of the short duration interactive video introduction system 100 described herein. Note that one or more general purpose virtual or physical computing systems suitably instructed or a special purpose computing system may be used to implement a short duration interactive video introduction system 100. Further, the short duration interactive video introduction system 100 may be implemented in software, hardware, firmware, or in some combination to achieve the capabilities described herein. Note that one or more general purpose or special purpose computing systems/devices may be used to implement the described techniques. However, just because it is possible to implement the short duration interactive video introduction system 100 on a general purpose computing system does not mean that the techniques themselves or the operations required to implement the techniques are conventional or well known.

The computing system 102 (interchangeably referred to herein as a computer system 102) may comprise one or more server and/or client computing systems, and/or may span distributed locations. In addition, each block shown may represent one or more such blocks as appropriate to a specific embodiment and/or may be combined with other blocks. Moreover, the various blocks of the short duration interactive video introduction system 100 may physically reside on one or more machines, which use standard (e.g., TCP/IP) or proprietary interprocess communication mechanisms to communicate with each other.

For example, but not limited to, the computing system 102 may be implemented as a web site that interacts with a plurality of different web-based social media sites that manage a particular social media site platform. As another example, the short duration interactive video introduction system 100 may itself be implemented at a particular social media site platform as an application programming interface (API) resident at the social media site, and/or may be integrated into the program coding of the social media site platform itself. As yet another example, the short duration interactive video introduction system 100, or a portion thereof, may be implemented on a variety of user devices, such as smartphones, cell phones, laptops, personal computers, desktop computers, notebooks, or other personal computing devices that are used by a user (site member) when interacting with the social media site. In some embodiments, the computing system 102 may itself be a social media site platform (a web hosting service site that operates electronic devices, such as servers, to create and maintain the social media site that is connected to the world wide web) that hosts the social media site being used by the requesting user and/or the unknown person of interest. All such embodiments of the short duration interactive video introduction system 100 are intended to be disclosed herein and to be protected by the accompanying claims.

In the non-limiting example embodiment shown in FIG. 1, computer system 102 comprises a computer memory ("memory") 104, an optional display 106, one or more Central Processing Units ("CPU") 108, optional Input/Output devices 110 (e.g., keyboard, mouse, CRT or LCD display, etc.), other computer-readable media 112, and one or more network connections 114. The social media site interface module 116, the short duration interactive video introduction invitation module 118, the user device interface module 120, the short duration interactive video introduction payment module 122, the interactive video management module 124, the interactive video user database 126, the recorded interactive video database 128, and a processor 130, are shown residing in memory 102. In other embodiments, some portion of the contents and/or some of (or all of) the components of the short duration interactive video introduction system 100 may be stored on and/or transmitted over the other local and/or remote computer-readable media.

Information pertaining to the users of the short duration interactive video introduction system 100 are stored in the interactive video user database 126. The information is associated with one or more identifiers that uniquely identify the requesting user. In some embodiments, the interactive video user database 126 may include user information pertaining to the unknown person of interest. For example, information identifying an email address, an electronic device, a cell phone number, billing information, physical address information, preferences (likes and dislikes), or the like for each user (the requesting user and/or the unknown person of interest) may be stored in the social media site user database 126. In some embodiments, the user information is stored locally in the interactive video user database 126 residing in memory 104. Alternatively, or additionally, the user information may be stored in other data repositories 132 that may be local and/or that may be remote from the computer system 102.

The components of the short duration interactive video introduction system 100 preferably execute on one or more CPUs 108 executing the processor 130 to manage the generation and use of the short duration interactive video introductions, short duration interactive video introduction invitations, stored short duration interactive video introductions, and the like as described herein. Other code or programs 134 and potentially other data repositories, such as data repository 132, might also reside in the memory 102, and preferably execute on one or more CPUs 108. Of note, one or more of the components in FIG. 1 may not be present in any specific implementation. For example, but not limited to, some embodiments embedded in other software may not provide means for user input or display.

In an example embodiment, components/modules of the short duration interactive video introduction system 100 are implemented using standard programming techniques. For example, the short duration interactive video introduction system 100 may be implemented as a "native" executable running on the CPU 108, along with one or more static or dynamic libraries. In other embodiments, the short duration interactive video introduction system 100 may be implemented as instructions processed by a virtual machine. In general, a range of programming languages known in the art may be employed for implementing such example embodiments of the short duration interactive video introduction system 100, including representative implementations of various programming language paradigms, including but not limited to, object-oriented (e.g., Java, C++, C #, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments of the short duration interactive video introduction system 100 described herein may also use well-known or proprietary, synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously and communicate using message passing techniques. Equivalent synchronous embodiments are also supported.

Also, the example short duration interactive video introduction system 100 may be implemented in a distributed environment comprising multiple, even heterogeneous, computer systems and networks. Different configurations and locations of programs and data are contemplated for use with techniques of described herein. In addition, the short duration interactive video introduction system 100 may be physical or virtual computing systems and may reside on the same physical system. Also, one or more of the modules may themselves be distributed, pooled or otherwise grouped, such as for load balancing, reliability or security reasons. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, etc.) and the like. Other variations are possible. Also, other functionality could be provided by each component/module, or existing functionality could be distributed amongst the components/modules in different ways, yet still achieve the functions of a short duration interactive video introduction system 100.

Furthermore, in some embodiments, some or all of the components of the short duration interactive video introduction system 100 may be implemented or provided in other manners, such as at least partially in firmware and/or hardware, including, but not limited to one or more application-specific integrated circuits (ASICs), standard integrated circuits, controllers executing appropriate instructions, and including microcontrollers and/or embedded controllers, field-programmable gate arrays (FPGAs), complex programmable logic devices (CPLDs), and the like. Some or all of the system components and/or data structures may also be stored as contents (e.g., as executable or other machine-readable software instructions or structured data) on a computer-readable medium (e.g., a hard disk; memory; network; other computer-readable medium; or other portable media article to be read by an appropriate drive or via an appropriate connection, such as a DVD, SSD, or flash memory device) to enable the computer-readable medium to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Accordingly, embodiments of the short duration interactive video introduction system 100 may be practiced with other computer system configurations.

In practice, the user may be accessing a particular social media site 136 using an electronic device, such as their smartphone 138 and/or their personal computer 140, via a communication network 142 comprised of many electronic communication devices. Here, the social media site is a web based electronic system using a plurality of different types of electronic devices to provide webpages and other information to the social media site members. The network 142 is illustrated as a generic communication system. In one embodiment, the network 142 comprises a cellular telephone system, such as a radio frequency (RF) wireless system. Accordingly, the smartphone 138 and/or personal computer 140 includes a suitable transceiver. Alternatively, the network 142 may be a telephony system, the Internet, a Wi-fi system, Bluetooth, a near-field communication system, a microwave communication system, a fiber optics system, an intranet system, a local access network (LAN) system, an Ethernet system, a cable system, a radio frequency system, a cellular system, an infrared system, a satellite system, or a hybrid system comprised of multiple types of communication media. Additionally, the network 142 may be implemented to communicate using other types of communication technologies, such as but not limited to, digital subscriber loop (DSL), X.25, Internet Protocol (IP), Ethernet, Integrated Services Digital Network (ISDN) and asynchronous transfer mode (ATM), and 4G/5G wireless networks. Also, the network 142 may be configured to communicate over combination systems having a plurality of segments which employ different formats for each segment that employ different technologies on each segment.

In some embodiments, the short duration interactive video introduction system 100 may be implemented as an integrated component of a computing system implementing a social media site platform (a plurality of electronic devices)

at a particular social media site 136 (FIG. 1). In such embodiments, the short duration interactive video introduction between the requesting user and the unknown person of interest is managed by the social media site 136. Here, access to short duration interactive video introductions may be limited to parties who are also members of that particular social media site 136. In other situations, the social media site 136 may permit other web sites and/or electronic devices of non-members to participate in a short duration interactive video introduction. Access may be provided free of charge and/or may be provided for an access fee.

If an access fee is charged to the user, the short duration interactive video introduction payment module 120 would process the requesting user's payment. Preferably, payment information such as a credit card number, bank account number, electronic digital wallet system, or the like may be stored in the interactive video user database 126 for the requesting user and/or the unknown person of interest so that payments can be automatically processed. Upon confirmation of payment, the short duration interactive video introduction invitation module 118 would then facilitate the short duration interactive video introduction between the participants. For example, the short duration interactive video introduction system 100 may track occurrences of short duration interactive video introductions. If there has be a first short duration interactive video introduction provided free of charge, then the short duration interactive video introduction system 100 can identify requests for subsequent short duration interactive video introductions from either party, and then charge the requesting party for such subsequent short duration interactive video introductions.

Figure 2:
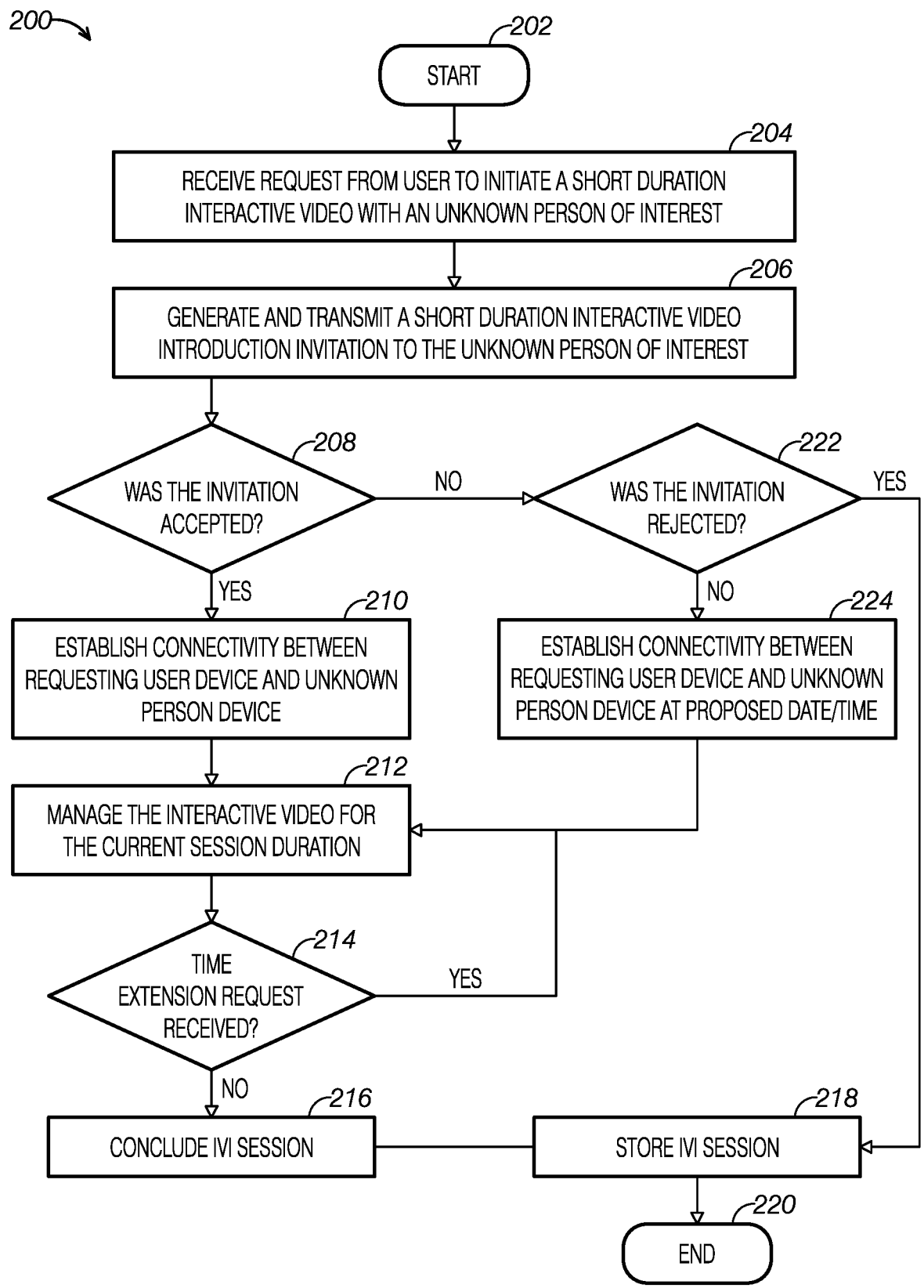
FIG. 2 is a flowchart illustrating the operation of a nonlimiting example embodiment of the short duration interactive video introduction system.

FIG. 2 is a flowchart 200 illustrating the operation of a nonlimiting example embodiment of the short duration interactive video introduction system 100 (FIG. 1). The flowchart 200 shows the architecture, functionality, and operation of a possible implementation of the software for implementing the short duration interactive video introduction system 100. In this regard, each block may represent a module, segment, or portion of code, which comprises one or more executable instructions for implementing the specified logical function(s). It should also be noted that in some alternative implementations, the functions noted in the blocks may occur out of the order noted in FIG. 2, may include additional functions, and/or may omit some functions. For example, two blocks shown in succession in FIG. 2 may in fact be executed substantially concurrently, the blocks may sometimes be executed in the reverse order, or some of the blocks may not be executed in all instances, depending upon the functionality involved. All such modifications and variations are intended to be included herein within the scope of this disclosure.

With respect to FIG. 2, the short duration interactive video introduction invitation process 200 starts at block 202. For example, the process 200 may start in response to receiving a request from a user (interchangeably referred to herein as a user request) to conduct a short duration interactive video introduction with an unknown person of interest that has been identified on a social media site by the user. The requesting user performs an operation using their electronic device that the user intuitively understands will initiate the short duration interactive video introduction process. For example, a hotspot graphical icon (virtual button) corresponding to a hotspot (a predefined physical location on a display of the user's electronic device) may be presented on the display of the electronic device to the user while the user is navigating a particular social media site. A suitable hotspot graphical icon such as a button, object, cartoon character or the like may be used to indicate the selectable hotspot. If the display is a touch sensitive screen, the user simply touches the hotspot graphical icon associated with the short duration interactive video introduction hotspot to initiate the process. With other displays, the user may navigate a pointer, cursor, or the like to the hotspot graphic icon, and then perform a select operation when the pointer, cursor, or the like is over or is near the hotspot graphical icon.

In some embodiments, the hotspot graphical icon is presented on the display in proximity to the presenting social media site webpage, or even over a portion of the social media site webpage, that the user is currently viewing. In such embodiments, the user's electronic device executes a logic module of the short duration interactive video introduction system 100, such as the example short duration interactive video introduction management module 122, that presents the hotspot graphical icon on the display. This logic, in response to the user request, initiates the short duration interactive video introduction process at block 200. In response to detecting the user's selection of the hotspot graphical icon, the short duration interactive video introduction module executing on the user's electronic device generates a user request message to initiate the short duration interactive video introduction that is then communicated to the short duration interactive video introduction system 100. The user request message includes at least information identifying the unknown person of interest.

Alternatively, or additionally, the social media site platform may execute an integrated short duration interactive video introduction management module 122 that presents the hotspot graphical icon as art of the presented website page. In such embodiments, the user's selection of the hotspot graphical icon is detected by the social media site platform. The process of detecting the user's selection inherently includes generation and communication of a user request message that is received at the social media site platform. In this embodiment, the social media site platform also identifies the unknown person of interest (since the webpage that is presenting the profile of the unknown person of interest is currently being viewed by the requesting user).

Accordingly, at block 204, embodiments of the short duration interactive video introduction system 100 (whether implemented as a stand-alone website or implemented as an integrated module in the programming of the social media site platform) receives the user request message to initiate a short duration interactive video introduction with the identified unknown person of interest. The user request message is communicated from the electronic device being used by the requesting user in response to the user's request.

In embodiments of the short duration interactive video introduction system 100 are remote from the electronic device of the user, one skilled in the art appreciates that the user request message does not require a link (since the computer system 102 does not execute a link to establish connectivity to the requesting user's electronic device). Rather, the user request information includes information that sufficiently identifies the electronic device of the user with sufficient information that a suitable link can be generated for communication to the electronic device being used by the unknown person of interest. (One skilled int eh arts appreciates that even is a link in included in the user request message, that link will not be suitable for communicate to the various electronic devices of the unknown person of interest because of message formatting issues.)

If one or more modules of the short duration interactive video introduction system 100 are integrated into the electronic device of the requesting user, the user request message is defined to be the signal that is generated by the input device that is actuated by the user. For example, it the user touches a hotspot on a touch sensitive display, then the signal generated by the touchscreen sensitive display that is communicate to the processor system of the electronic device of the requesting user is defined as the user request message. The processor system of the electronic device of the requesting user then executes the one or more integrated modules of the short duration interactive video introduction system 100 to initiate the process of establishing a short duration interactive video introduction session.

At block 206, in response to receiving the user request message, embodiments of the short duration interactive video introduction system 100 generate and transmit a short duration interactive video introduction invitation to one or more electronic devices that are associated with, and that are preferably being used by, the unknown person of interest. Here, the short duration interactive video introduction invitation module 118 (FIG. 1) is executed to generate the short duration interactive video introduction using a data format (interchangeably referred to herein as a communication format) that is compatible with the user's electronic device. The data format of a communicated short duration interactive video introduction invitation may be cooperatively managed by the executing user device interface module 120. In some embodiments, the short duration interactive video introduction invitation may include a link that establishes communication connectivity back to the electronic device of the requesting user.

For example, the electronic device of the unknown person of interest may be a smartphone or the like that is capable of receiving and responding to text messages. The executing short duration interactive video introduction management module 122 and user device interface module 120 cooperatively generate a text message that is communicated to the smartphone of the unknown person of interest. The text message may indicate that a short duration interactive video introduction invitation has been received. In some embodiments, a reply by the unknown person of interest to the text message may be analyzed to determine if an acceptance, rejection or reschedule request to the short duration interactive video introduction invitation is intended by the responding unknown person of interest. Artificial Intelligence logic may be employed for such an analysis of a return text. For example, the unknown person of interest may reply with a text message saying "Yes" that is interpreted as an acceptance of the short duration interactive video introduction invitation. In other situations, a selectable link may be included in the text message.

Alternatively, or additionally, an email indicating the short duration interactive video introduction invitation may be communicated to an email system account of the unknown person of interest. In some embodiments, a reply by the unknown person of interest to the email message may be analyzed to determine if an acceptance, rejection or reschedule request to the short duration interactive video introduction invitation is intended by the responding unknown person of interest. Artificial Intelligence logic may be employed for such an analysis of a return text. For example, the unknown person of interest may reply with an email message with a return email saying "Yes" that is interpreted as an acceptance of the short duration interactive video introduction invitation. In other situations, a selectable link may be included in the email message Alternatively, or additionally, a link may be included in the short duration interactive video introduction invitation that is generated and communicated to the electronic device being used by the unknown person of interest. For instance, the unknown person of interest may be browsing a web page provided by the social media site (or another remote website) using their laptop or PC. The link, with an associated graphical user interface, may then be communicated to the electronic device of the unknown person of interest as a pop up message or the like. The link is then presented on the display being viewed by the unknown person of interest.

In some instances, it may be that the unknown person of interest is also concurrently active on the social media site when the user request message is received by the short duration interactive video introduction system 100. For example, the unknown person of interest may be using a browser on their smartphone, laptop, or PC to view webpages provided by the social media site platform. In this case, the social media site platform, executing the short duration interactive video introduction invitation module 118 and the user device interface module 120, may generate and present a short duration interactive video introduction invitation on the webpage (formatted for the particular electronic device being used) that is being viewed by the unknown person of interest.

One skilled in the art appreciates that there are numerous ways that a short duration interactive video introduction invitation may be generated, communicated, and then presented to the unknown person of interest. All such embodiments now known or later developed are intended to be disclosed herein and to be protected by the accompanying claims.

At block 208, a determination is made whether the unknown person of interest has accepted the short duration interactive video introduction invitation. This determination may be made by the executing short duration interactive video introduction management module 122.

For example, if the short duration interactive video introduction invitation includes a hotspot graphical icon (associated with a link) that is presented on the display of the electronic device being used by the unknown person of interest is selected, the selection is interpreted as an acceptance of the short duration interactive video introduction invitation (the YES condition) by the unknown person of interest. If the short duration interactive video introduction invitation is in the form of an email, a proscribed response in the email message and/or selection of a link embedded in the email message may be interpreted as an invitation acceptance. Any suitable indication of acceptance of the short duration interactive video introduction invitation by the unknown person of interest that is now known or later developed is intended to be within the scope of this disclosure and to be protected by the accompanying claims.

At block 210, in response to acceptance of the short duration interactive video introduction invitation by the unknown person of interest, connectivity between an electronic device used by the requesting user and an electronic device used by the unknown person of interest is established using a communication link(s). Embodiments of the short duration interactive video introduction system 100, executing the short duration interactive video introduction management module 122 and the user device interface module 120 on computer system 104, manage this interconnection between electronic devices. The interconnecting may be accomplished in any suitable manner between the two electronic devices. In some instances, information identifying the electronic device(s) of the unknown person of interest may be stored in the interactive video user database 126, and may be retrieved to establish the communication link between the devices of the requesting user and the unknown person of interest.

Often the electronic devices used by the requesting user and the unknown person of interest will be different from each other. For example, the requesting user may be using their smartphone, and the unknown person of interest may be using their laptop. Here, the user device interface module 120 can format bidirectional communications for presentation on the requesting user's smartphone and the unknown person of interest's laptop.

As another example, the requesting user may be browsing the profile webpage of the unknown person of interest using their laptop or PC, while the unknown person of interest is not currently using any electronic device. The short duration interactive video introduction system 100 may send a text message (the short duration interactive video introduction invitation) to the smartphone of the unknown person of interest. If the text message incudes a link, the selection of that link by the unknown person of interest (interpreted as an acceptance of the invitation) may cause the smartphone of the unknown person of interest to establish a video conversation with a video conversation program residing on the requesting user's laptop. Alternatively, selection of the link may cause the smartphone of the unknown person of interest to open up a website page being hosted by the social media site. The presented webpage may include a second selectable link associated with the short duration interactive video introduction invitation that then initiates the short duration interactive video introduction session.

Once video connectivity between the two electronic devices has been established, the executing short duration interactive video introduction management module 122 at block 212, manages the short duration interactive video introduction for the predefined duration associated with the time-limited short duration interactive video introduction. Here, the requesting user and the unknown person of interest may view and talk with each other during the time-limited short duration interactive video introduction for at least the time limited period.

During the short duration interactive video introduction, the executing short duration interactive video introduction management module 122 monitors the ongoing communications between the electronic devices for an interactive video continuation request from either the requesting user or the unknown person of interest at block 214. An interactive video continuation request may be implemented as one or more graphical hotspots that are presented on the display of the electronic device. If an interactive video continuation request is not received (the NO condition) before expiration of the predefined time duration, then the short duration interactive video introduction management module 122 concludes (ends) the short duration interactive video introduction (IVI) session at block 216. At block 218, the short duration interactive video introduction management module 122 stores the short duration interactive video introduction (IVI) session into the recorded interactive video database 128 for later review by the requesting user, and optionally for review by the unknown person of interest. The process then ends at block 220.

However, if an interactive video continuation request is received before or by the expiration of the predefined time duration (interchangeably referred to herein as a first selectable predefined duration), then the short duration interactive video introduction management module 122 adjusts the remaining time for the ongoing short duration interactive video introduction session by some predefined time extension duration (interchangeably referred to herein as a second selectable predefined duration), and returns to block 212. In a preferred embodiment, the amount of time of the time extension duration associated with an interactive video continuation request is added to the remaining time allowed for the time-limited short duration interactive video introduction to generate an adjusted duration. For example, a hypothetical time-limited short duration interactive video introduction may have an initial time duration of thirty seconds. If twenty seconds of the short duration interactive video introduction has elapsed, and if an interactive video continuation request is received for a sixty second time duration extension, then the remaining time of the ongoing short duration interactive video introduction will be adjusted from ten seconds to seventy seconds. Alternatively, the ten seconds remaining may be allowed to run, and then a new adjusted duration of sixty seconds may be set for the ongoing and uninterrupted short duration interactive video introduction.

In some situations, the interactive video continuation request may not be received before the expiration of the predefined time duration of the initial short duration interactive video introduction. Alternatively, if a confirmation or acceptance of the requested interactive video continuation is required from the other party, the confirmation may not be received before expiration of the predefined time duration of the short duration interactive video introduction. Here, in response to receiving an interactive video continuation request and/or a confirmation, the short duration interactive video introduction management module 122 re-establishes communication between the two electronic devices so that a second short duration interactive video introduction session can be conducted. Preferably, the re-connection between the two electronic devices occurs as quickly as possible to minimize the disruption in the video conversation between the requesting user and the unknown person of interest.

When a brief interruption in the short duration interactive video introduction session occurs, some embodiments of the short duration interactive video introduction system 100 are configured to combine the recorded first short duration interactive video introduction session with the second later recorded short duration interactive video introduction session into a single video and audio recording that is then stored into the recorded interactive video database 128. Accordingly, the requesting user and/or the unknown person of interest may later review the entirety of the multiple short duration interactive video introduction sessions by generating and communicating a user request to the short duration interactive video introduction system 100.

Returning to block 208, a determination may be made that the short duration interactive video introduction invitation was not accepted (declined) by the unknown person of interest (the NO condition). For instance, the unknown person of interest may be preoccupied and unable to accept the short duration interactive video introduction invitation at the time of the arrival of the invitation, but may be willing to conduct a short duration interactive video introduction at a later date and/or time. For example, the smart phone 132 of the unknown person of interest may be busy with another call. As another non-limiting example, the electronic device of the unknown person of interest may be offline. As yet another example, the unknown person of interest may be online, but not using the social media site, when the short duration interactive video introduction invitation was generated by the requesting user. Alternatively, or additionally, some embodiments of the short duration interactive video introduction system 100 determines that the unknown person of interest is not available when the short duration interactive video introduction invitation is not accepted within some predefined duration.

On the other hand, the unknown person of interest may not be interested in accepting the short duration interactive video introduction invitation at any time. Some embodiments of the short duration interactive video introduction system 100 provide a hotspot graphical icon to the unknown person of interest that indicates a selection of that hotspot graphical icon will result in a rejection of the short duration interactive video introduction invitation. That is, the unknown person of interest has declined the short duration interactive video introduction invitation. Alternatively, or additionally, some embodiments of the short duration interactive video introduction system 100 determine that the unknown person of interest has declined the short duration interactive video introduction invitation if the invitation is not accepted within some predefined duration.

Accordingly, at block 222, a determination is made whether the unknown person of interest has declined the short duration interactive video introduction invitation (the YES condition). If the short duration interactive video introduction invitation was declined, the process advances to block 218 and information associated with this short duration interactive video introduction session is stored. In some embodiments, when a request for a short duration interactive video introduction is denied, a polite informative message is sent to the requesting user to indicate that their short duration interactive video introduction invitation has been denied.

One skilled in the arts appreciates that no video or audio data will be stored in this situation. However, information identifying the requesting user, information identifying the unknown person of interest, and/or the date and time of the initiation of the short duration interactive video introduction invitation or user request may be stored. Here, in the event that the requesting user at a later time again tries to have a short duration interactive video introduction invitation with the same unknown person of interest, embodiments of the short duration interactive video introduction system 100 may advise the requesting user of the previous rejection by that particular unknown person of interest. Conversely, in the event that the unknown person of interest at a later time tries to have a short duration interactive video introduction invitation with the same requesting user, embodiments of the short duration interactive video introduction system 100 may advise the unknown person of interest of their previous rejection of that particular requesting user.

Some embodiments of the short duration interactive video introduction system 100 may be configured to block later attempts to establish a short duration interactive video introduction session if the short duration interactive video introduction invitation has been previously rejected (declined). However, alternative embodiments may allow another attempt to establish a short duration interactive video introduction session by either of the requesting user or the unknown person of interest. Preferably, if subsequent short duration interactive video introduction invitations are allowed, graphical information describing the previous invitation rejections are presented to the requesting user and/or the unknown person of interest so that they may move forward with a subsequent short duration interactive video introduction session on an informed basis.

In some instances, when the unknown person of interest is currently preoccupied and cannot immediately accept the short duration interactive video introduction invitation (the NO condition at block 222), the unknown person of interest is allowed to propose an alternative time and date for conducting the short duration interactive video introduction session. Here, a suitable graphical user interface or a hotspot graphical icon is presented to the unknown person of interest for specification of the proposed alternative date and time. Some embodiments of the short duration interactive video introduction system 100 may send a message to the requesting user indicating the temporary unavailability of the unknown person of interest.

In response to the unknown person of interest proposing an alternative date and time, embodiments of the short duration interactive video introduction system 100 generate and communicate an alternative proposal message to the electronic device of the requesting user. The requesting user may accept or decline the proposed date and time indicated in the alternative proposal. If the requesting user accepts the proposal, the process proceeds to block 224. At block 224, embodiments establish the scheduled short duration interactive video introduction session when the designated alternative date and time arrives. Here, once the connectivity between the electronic device of the requesting user and the electronic device of the unknown person of interest has been established, the process proceeds to block 212 wherein the short duration interactive video introduction management module 122 manages the scheduled short duration interactive video introduction session.

It is appreciated that the requesting user may be later using an electronic device that is different from the electronic device that the requesting user initially used to initiate the short duration interactive video introduction process. For example, the requesting user may have used their laptop to initiate the short duration interactive video introduction process, but wants to use their smartphone to conduct the later scheduled short duration interactive video introduction session. Similarly, the unknown person of interest may wish to use a different electronic device to conduct the later scheduled short duration interactive video introduction session. Some embodiments of the short duration interactive video introduction system 100 allow the requesting user and/or the unknown person of interest to designate a particular electronic device for the later scheduled short duration interactive video introduction session. The short duration interactive video introduction system 100 may then establish connectivity between the designated electronic devices at the scheduled date and time.

Figure 3:
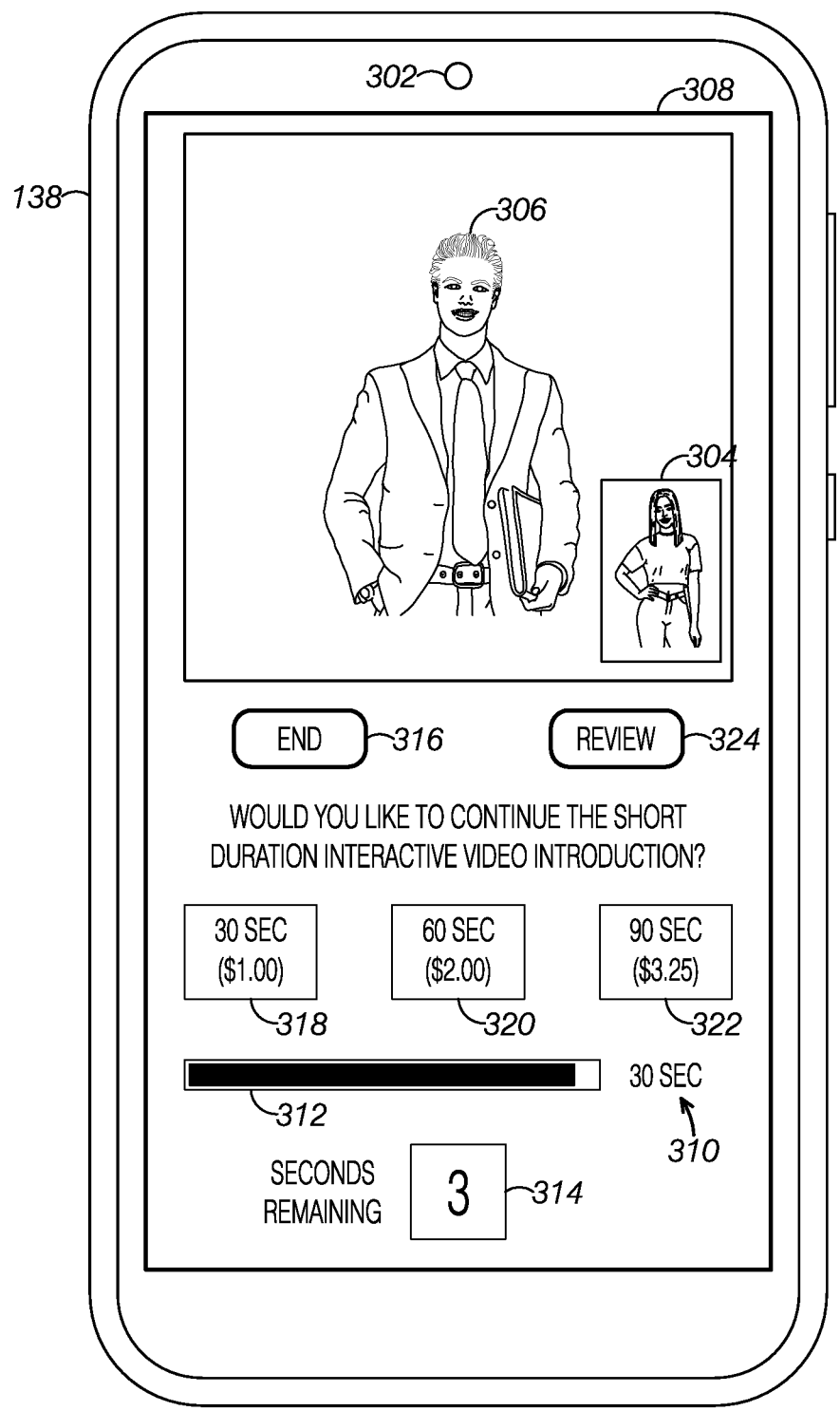
FIG. 3 is a conceptual diagram of a party's smartphone.

FIG. 3 is a conceptual diagram of a party's smartphone 138 having a display. In this simplified example, the requesting user and/or the unknown person of interest are interchangeably referred to herein as the party 304 who is using their smartphone 138 to conduct a short duration interactive video introduction session. Other electronic devices, such as PC 140 or laptop 140 having a display or coupled to a display, may be used to conduct short duration interactive video introductions. In practice, the requesting user initiates the request for a short duration interactive video introduction with the unknown person of interest. The short duration interactive video introduction system 100 generates a short duration interactive video introduction invitation that is communicated to an electronic device of the unknown person of interest. If the unknown person of interest accepts the received short duration interactive video introduction invitation, the initial short duration interactive video introduction begins.

During the short duration interactive video introduction, a camera 302 of the smartphone 138 acquires video images of the party 304 (and audio information) using the smartphone 138. An image of the currently acquired video image of the party 304 and the audio information is communicated to the electronic device being used by the other party 306. In some embodiments, a small thumbnail image of the party 304 may be optionally presented on the display 308 so that the party 304 may view themselves during the short duration interactive video introduction session. Concurrently, video and audio image from the electronic device used by the other party 306 is received at and is presented by the electronic device being used by the party 304. Accordingly, each party may view and hear the other party during the duration of the short duration interactive video introduction.

For example, assume that FIG. 3 illustrates the requesting user's smartphone 138. Here, the requesting user 304 is viewing a video of the unknown person of interest 306 acquired by the electronic device of the unknown person of interest. Similarly, the electronic device 138 of the requesting user acquires a video of the requesting user 304 (by camera 302) and acquires an audio stream as the requesting user is speaking (by a microphone of the smartphone 138). The video and audio stream are communicated to the electronic device of the unknown person of interest (the party 306 illustrated in FIG. 2).

During the short duration interactive video introduction, text 310 may indicate the duration of the short duration interactive video introduction, here thirty seconds in this non-limiting conceptual example. A sliding bar type graphic 312 may be optionally used to indicate the remaining duration of the short duration interactive video introduction, wherein a sliding bar indicates the amount of used duration and an amount of remaining duration for the ongoing short duration interactive video introduction. The sliding bar type graphic 312 may be presented only on the electronic device of the requesting user, or may be presented on both electronic devices, depending upon the embodiment.

In some embodiments, when a predefined point in the short duration interactive video introduction is reached, a countdown timer graphic 314 may be optionally presented to one or both parties to indicate the remaining time in the ongoing short duration interactive video introduction. For example, the illustrated countdown timer graphic 314 indicates that three seconds remain in the duration of the short duration interactive video introduction. Accordingly, the party viewing the countdown timer graphic 314 appreciates that the short duration interactive video introduction will be automatically halted by the short duration interactive video introduction system 100 in three seconds. The countdown timer graphic 314 may be presented only on the electronic device of the requesting user, or may be presented on both electronic devices, depending upon the embodiment.

If either of the parties wish to halt the short duration interactive video introduction at any time, they may select (touch if the display 308 is a touch sensitive display, for example) the hotspot graphical icon 316. In response to selection of the hotspot graphical icon 316, embodiments of the short duration interactive video introduction system 100 immediately end the short duration interactive video introduction.

Alternatively, the short duration interactive video introduction ends upon expiration of the predefined duration. In some embodiments, a pause image or GUI is presented on the display of the electronic devices. Here, both parties will then have had a brief time to decide if they wish to continue the introduction process using an interactive video continuation request. Alternatively, or additionally, the requesting user (via a second user request) and/or the unknown person of interest (via an unknown person of interest request) may access the stored short duration interactive video introduction session for review and contemplation. Either party may request an extension or a newly initiated short duration interactive video introduction session.

In the event that either party wishes to continue the short duration interactive video introduction process, one or more hotspot graphical icons with informative text may be selected (touched if the display 308 is a touch sensitive display, for example) by the party to initiate a continuation of the short duration interactive video introduction session. Selection of a hotspot graphical icon associated with an interactive video continuation request will extend the time period of the ongoing short duration interactive video introduction session.

Preferably, the requesting party will be required to pay a fee for the subsequent time extension of the ongoing short duration interactive video introduction. Here, selection of the hotspot graphical icon 318 will generate an interactive video continuation request to continue the short duration interactive video introduction session by an additional thirty seconds (for a fee of $1.00). Similarly, selection of the hotspot graphical icon 320 will generate an interactive video continuation request to continue the short duration interactive video introduction session by an additional sixty seconds (for a fee of $2.00). Selection of the hotspot graphical icon 322 will generate an interactive video continuation request to continue the short duration interactive video introduction session by an additional ninety seconds (for a fee of $3.25). Any suitable continuation time duration and associated fee may be indicated by the various embodiments of the short duration interactive video introduction system 100. Further, any suitable number of selections for a continuation of the short duration interactive video introduction may be used by the various embodiments.

In response to a party selecting one of the subsequent short duration interactive video introduction continuation options, a subsequent short duration interactive video introduction continuation invitation may then be optionally generated and communicated to the electronic device of the other party. If the other party accepts the subsequent short duration interactive video introduction continuation invitation, then the short duration interactive video introduction system 100 continues the short duration interactive video introduction session for the selected continuation time duration.

Optionally, the subsequent short duration interactive video introduction continuation invitation may indicate the duration of the requested subsequent short duration interactive video introduction. If the receiving party does not have sufficient time, and/or is not interested in continuing the introduction process for the indicated duration, they may decline the continuation invitation.

In some embodiments, the declining party may have the option to propose a scheduled short duration interactive video introduction at some future date and/or time. A scheduled subsequent short duration interactive video introduction invitation is then communicated back to the other party who may accept or decline the scheduled subsequent short duration interactive video introduction invitation. Accordingly, embodiments of the short duration interactive video introduction system 100 may facilitate future communications between the requesting user and the unknown person of interest (who by then is presumably a known person of interest).

Some embodiments may include a graphic 324 that rewinds and replays the short duration interactive video introduction which may be stored in the recorded interactive video database 128 (FIG. 1), preferably in response to a second user request, which may reside on the user's electronic device and/or at the short duration interactive video introduction system 100. The user may then review and further contemplate the other party's actions and voice to ascertain if they wish to continue the introduction process.

In some embodiments, if a first short duration interactive video introduction session has concluded, the requesting user and/or the unknown person of interest may be required to pay a fee for a subsequent short duration interactive video introduction session. Suitable GUIs pay be presented to the requesting user and/or the unknown person of interest when the initial short duration interactive video introduction session concludes giving them an option to pay for a continuing short duration interactive video introduction session or a new short duration interactive video introduction session.

When a short duration interactive video introduction session concludes, a closing screen or the like may be presented on the electronic device of the requesting user and/or the unknown person of interest. Any suitable closing screen may be used. For example, the last image of the video may continue to be presented as a still image. Alternatively, the entirety of the presentation of the short duration interactive video introduction session may be removed and the display may be returned to the last screen displayed prior to initiation of the short duration interactive video introduction session. Some embodiments may include a text box that can be used to input user notes that are stored with the short duration interactive video introduction session.

Figure 4:
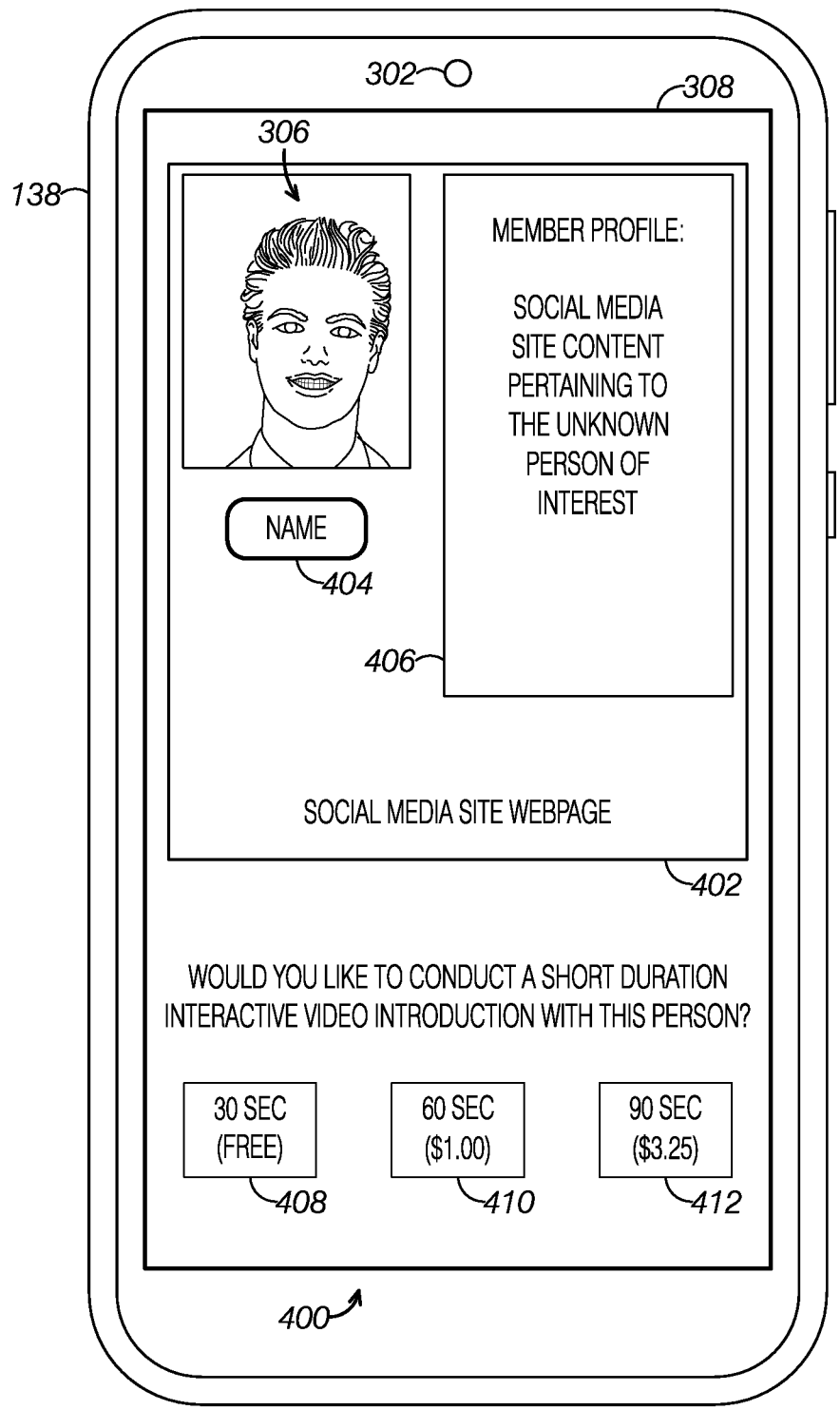
FIG. 4 is a conceptual diagram of a hypothetical presentation on the display of the requesting user's smartphone that is used to generate the user request.

FIG. 4 is a conceptual diagram of a hypothetical presentation on the display 308 of the requesting user's smartphone 138 that is used to generate the user request that initiates the process of conducting the short duration interactive video introduction with the unknown person of interest 202 (corresponding to the party 306 described above and illustrated in FIG. 3). Other electronic devices, such as the PC 134, may be used to generate user request. In practice, the short duration interactive video introduction invitation module 118 (FIG. 1) is executed to provide a graphical user interface (GUI) 400 that is presented on the electronic device being used by the requesting user.

In the hypothetical illustrative example illustrated in FIG. 4, the user may be using their electronic device to browse a webpage 402 that presents content provided by a social media site 136. In this simplified example, the webpage 402 is presented on an upper portion of the display 308. At times during the browsing process, image information identifying the unknown person will be shown at part of the content presented by the social media site. For example, but not limited to, the image information may include a small graphical thumbnail image of the unknown person 306. Alternatively, or additionally, the name information 404 may be presented on the webpage 402, such as the name, nickname or handle of the unknown person 306. Additionally, member profile information 406 about the unknown person of interest 306 may be presented on the webpage 402.

If the browsing user is interested in learning more about the unknown person 306, the user may initiate a request for a short duration interactive video introduction using the GUI 400. Here, a region of the display 308 is used to present the GUI 400 that includes a plurality of hotspot graphical icons that indicate selection options to initiate a short duration interactive video introduction invitation.

In some alternative embodiments, the selection options are generated by the short duration interactive video introduction system 100 for concurrent presentation with the social media site webpage 402. In other embodiments, the selectin icons are presented by the social media site on the webpage 402 to indicate to the viewing user that one or more time-limited short duration interactive video introductions are available for that particular unknown person of interest.

Here, FIG. 4 conceptually illustrates that a thirty second short duration interactive video introduction invitation may be requested for free by touching (selecting) the active hot spot 408. Alternatively, a sixty second short duration interactive video introduction may be requested for $1.00 by touching the active hot spot 410. Alternatively, a ninety second short duration interactive video introduction may be requested for $3.25 by touching the active hot spot 412. Based on the user's selection that generates a user request, a short duration interactive video introduction invitation is generated by the short duration interactive video introduction system 100 and is communicated to the electronic device of the unknown person of interest.

It is appreciated that the above-described conceptual diagrams of FIG. 3 and FIG. 4 illustrate an example short duration interactive video introduction requesting process and presentation displays for a non-limiting short duration interactive video introduction system process. Any suitable information presented to the requesting user and/or the unknown person of interest may be used by the various embodiments. Also, other control options may be provided to the requesting user and/or the unknown person of interest. All such variations now known or later developed are intended to be included within the scope of this disclosure.

Figure 5:
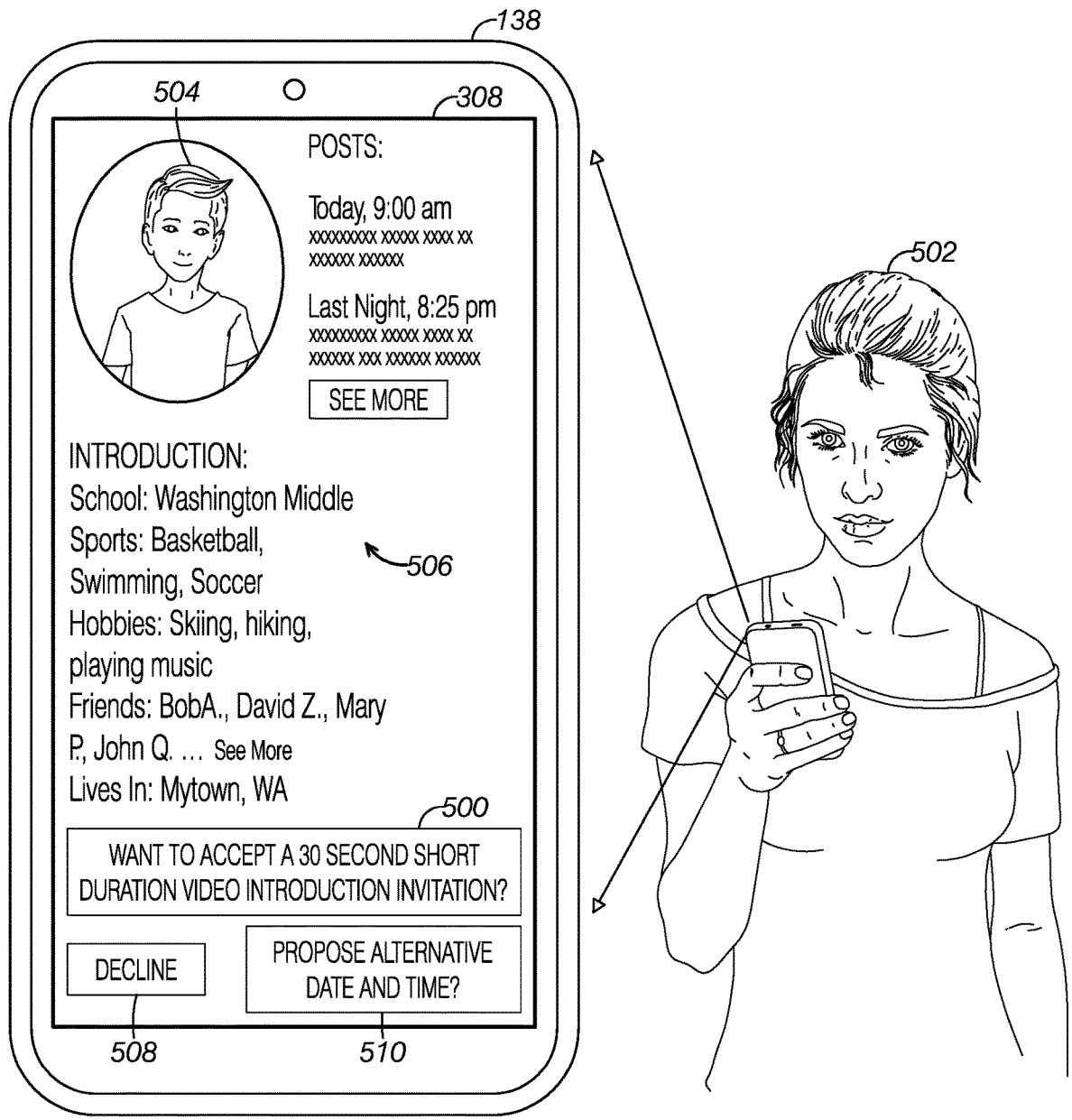
FIG. 5 is a conceptual diagram of a smartphone presenting a short duration interactive video introduction invitation to the unknown person of interest.

FIG. 5 is a conceptual diagram of a smartphone 138 presenting a short duration interactive video introduction invitation, presented as a hotspot graphical icon 500 with an embedded link (not shown), to the unknown person of interest 502. Various embodiments of the short duration interactive video introduction system 100 generate and communicate a short duration interactive video introduction invitation to an electronic device of the unknown person of interest 502. Selection of the hotspot graphical icon 500 will constitute an acceptance of the short duration interactive video introduction invitation.

In the simplified hypothetical example of FIG. 5, the unknown person of interest 502 is conceptually illustrated as a young adult who viewing the display 308. The requesting user 504 is conceptually illustrated as another young adult who interested in the unknown person of interest 502.

In this example embodiment, the unknown person of interest 502 receives a text message or similar message from the short duration interactive video introduction system 100 (or from the social media site platform that is integrated with the short duration interactive video introduction system 100). When the unknown person of interest 502 opens the short duration interactive video introduction invitation, various supplemental information 506 pertaining to the requesting user 504 may be presented on the display 308. For example, a profile image of the requesting user 504 may be shown to the unknown person of interest 502. Other profile information about the requesting user 504 may also be presented on the display 308. Based on the presented supplemental information 506, the viewing unknown person of interest 502 may decide to accept the short duration interactive video introduction invitation, decline the short duration interactive video introduction invitation (by selecting another optionally presented hotspot graphical icon 508), or propose an alternative date and time for a later scheduled short duration interactive video introduction session (by selecting another optionally presented hotspot graphical icon 510). Any suitable text may be used on the hotspot graphical icons 500, 508, 510 to inform the unknown person of interest 502 that the received communication is a short duration interactive video introduction invitation and of their invitation response choices.

In some embodiments, the supplemental information 506 may be separately provided by a member profile webpage provided by the social media site platform to the smartphone 138. A portion of the short duration interactive video introduction system 100 implemented on the smartphone 138 integrates to supplemental information 506 received from the social media site and the short duration interactive video introduction invitation received from the short duration interactive video introduction system 100 into a single image that is presented on the display 308. Here, the short duration interactive video introduction system 100 concurrently presents the hotspot graphical icon 500 below, or over, the webpage, as a pop up image or the like.

In other embodiments, the social media site platform generates both the supplemental information 506 and the hotspot graphical icon 500 as a webpage. In such embodiments, the short duration interactive video introduction system 100 is integrated with the social media site platform program code, wherein the hotspot graphical icon 500 is an integrated element of the presented webpage.

In yet other embodiments, the short duration interactive video introduction system 100 accesses the supplemental information 506 associated with the requesting user 504 from the social media site platform. The short duration interactive video introduction system 100 may communicate a request for supplemental information that incudes identity information of the requesting user 504. In response to receiving the supplemental information request from the short duration interactive video introduction system 100, the social media site platform returns the supplemental information to the short duration interactive video introduction system 100. Further, the social media site platform optionally provides connectivity information for one or more electronic devices used by the unknown person of interest 502. (Alternatively, or additionally, if the unknown person of interest is identifiable, the information pertaining to their electronic devices may be available from the interactive video user database 126 illustrated in FIG. 1.) The short duration interactive video introduction system 100 then generates the short duration interactive video introduction invitation that includes the supplemental information 506.

It should be emphasized that the above-described embodiments of the short duration interactive video introduction system 100 are merely possible examples of implementations of the invention. Many variations and modifications may be made to the above-described embodiments. All such modifications and variations are intended to be included herein within the scope of this disclosure and protected by any later filed claims.

Furthermore, the disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower, or equal in scope to the original claims, are to be considered within the subject matter of the inventions described herein.

Therefore, having thus described the invention, at least the following is claimed:

1. A short duration interactive video introduction system that facilitates a short duration interactive video introduction session between a requesting user and an unknown person of interest that is a member of a social media site, comprising:
    a first network connection that communicatively couples the short duration interactive video introduction system to a first electronic device used by the requesting user, wherein the first network connection receives a user request from the first electronic device to conduct the short duration interactive video introduction session with the unknown person of interest;
    a central processing unit that generates a short duration interactive video introduction invitation in response to receiving the user request; and
    a second network connection that communicatively couples the short duration interactive video introduction system to a second electronic device,
    wherein the central processing unit communicates short duration interactive video introduction invitation to the second electronic device via the second network connection,
    wherein the short duration interactive video introduction invitation includes a selectable link configured to establish communication connectivity between the first electronic device of the requesting user and an electronic device of the unknown person of interest,
    wherein the short duration interactive video introduction invitation that identifies the requesting user and that has the selectable link is presented on a display of the electronic device of the unknown person of interest in response to the electronic device of the unknown person of interest receiving the short duration interactive video introduction invitation,
    wherein the first electronic device of the requesting user and the electronic device of the unknown person of interest are communicatively coupled together in response to receiving an acceptance of the short duration interactive video introduction invitation by the unknown person of interest,
    wherein the central processing unit conducts the short duration interactive video introduction session between the requesting user and the unknown person of interest in response to communicatively coupling the first electronic device of the requesting user and the electronic device of the unknown person of interest, and
    wherein the central processing unit ends the short duration interactive video introduction session upon expiration of a predefined duration,
    wherein the predefined duration that causes the central processing unit to end the short duration interactive video introduction session is a first selectable predefined duration that is selectable by the requesting user, and wherein a second selectable predefined duration that is selectable by the requesting user causes the central processing unit to end the short duration interactive video introduction session at the expiration of the second selectable predefined duration.

2. The short duration interactive video introduction system of claim 1, wherein the user request consists of:
first identity information that identifies the requesting user;
social media site identity information that identifies the social media site;
second identity information that identifies the unknown person of interest; and
electronic device information that identifies the electronic device being used by the requesting user,
wherein the short duration interactive video introduction invitation identifies the requesting user based on the first identify information,
wherein the short duration interactive video introduction invitation is directed to the unknown person of interest based on the social media site information and based on the second identify information, and
wherein the selectable link is generated based on the electronic device information.

3. The short duration interactive video introduction system of claim 1, wherein a first time period of the first selectable predefined duration is less than a second time period of the second selectable predefined duration.

4. The short duration interactive video introduction system of claim 3,
wherein the first time period of the first selectable predefined duration is thirty seconds, and
wherein the second time period of the second selectable predefined duration is ninety seconds.

5. The short duration interactive video introduction system of claim 3,
wherein the first selectable predefined duration is selectable by the requesting user at no charge, and
wherein the second selectable predefined duration is selectable by the requesting user at a charge.

6. The short duration interactive video introduction system of claim 3,
wherein the second selectable predefined duration is selectable by the requesting user is selectable while the short duration interactive video introduction session is being conducted by the short duration interactive video introduction system,
wherein an adjusted duration is determined by adding the second selectable predefined duration to a remaining duration of the first selectable predefined duration in response to selection of the second selectable predefined duration by the requesting user, and
wherein the short duration interactive video introduction session continues to be conducted until the expiration of the adjusted duration.

7. The short duration interactive video introduction system of claim 1,
wherein central processing unit, the first network connection, and the second network connection reside in a social media site platform that hosts the social media site.

8. The short duration interactive video introduction system of claim 7,
wherein central processing unit of the social media site generates the short duration interactive video introduction invitation as a webpage with the selectable link in response to receiving the user request, and wherein the webpage with the selectable link is communicated to the electronic device of the unknown person of interest via the second network connection.

9. The short duration interactive video introduction system of claim 7,
wherein the second electronic device is a first type of electronic device that is used by the unknown person of interest,
wherein the electronic device of the unknown person of interest is a second type of electronic device that is different from the first type of electronic device,
wherein the short duration interactive video introduction invitation is communicated to the second electronic device in a first communication format that is used by the second electronic device,
wherein the short duration interactive video introduction invitation is communicated to both the second electronic device and the electronic device of the unknown person of interest,
wherein the short duration interactive video introduction invitation is communicated to the electronic device of the unknown person of interest in a second communication format that is used by the electronic device of the unknown person of interest, and
wherein the first communication format is different from the second communication format.

10. The short duration interactive video introduction system of claim 1, further comprising:
a computer system,
wherein central processing unit, the first network connection, and the second network connection reside in a computer system that is communicatively coupled to the social media site via the second network connection,
wherein the second electronic device resides in a social media site platform that hosts the social media site,
wherein the social media site generates a webpage with the short duration interactive video introduction invitation having the selectable link in response to receiving the short duration interactive video introduction invitation from the short duration interactive video introduction system,
wherein the webpage with the selectable link is communicated from the second electronic device to the electronic device of the unknown person of interest, and
wherein a display of the electronic device of the unknown person of interest presents the webpage with the short duration interactive video introduction invitation having the selectable link to the unknown person of interest.

11. The short duration interactive video introduction system of claim 1, further comprising:
a computer system,
wherein central processing unit, the first network connection, and the second network connection reside in the computer system that is communicatively coupled to a communication network via the second network connection,
wherein the second electronic device resides in the communication network,
wherein the social media site generates a webpage that is communicated to the electronic device of the unknown person of interest,
with the short duration interactive video introduction invitation having the selectable link is communicated to the electronic device of the unknown person of interest via the second electronic device of the communication network, and wherein the webpage received from the social media site and the short duration interactive video introduction invitation with the selectable link are concurrently presented on a display of the electronic device of the unknown person of interest.

12. The short duration interactive video introduction system of claim 11, wherein the second network connection is one of a plurality of second network connections, wherein each of the plurality of second network connections uniquely communicatively couples the short duration interactive video introduction system to one of a plurality of electronic devices of the unknown person of interest, wherein each one of the plurality of electronic devices of the unknown person of interest are different from each other and use a unique communication format, and wherein the short duration interactive video introduction invitation having the selectable link is communicated to each one of the plurality of electronic devices using the unique communication format that is used by the receiving electronic device.

13. The short duration interactive video introduction system of claim 1, wherein the acceptance of the short duration interactive video introduction invitation by the unknown person of interest is communicated to the short duration interactive video introduction system in response to the unknown person of interest's selection of the selectable link.

14. The short duration interactive video introduction system of claim 1, wherein in response to declining of the short duration interactive video introduction invitation by the unknown person of interest, the central processing unit generates a message that indicates that the short duration interactive video introduction invitation has been declined, and wherein the message that indicates that the short duration interactive video introduction invitation has been declined is communicated to the first electronic device of the requesting user via the first network connection.

15. The short duration interactive video introduction system of claim 1, wherein the user request is a first user request, further comprising:

a recorded interactive video database residing in a memory, wherein the central processing unit stores the short duration interactive video introduction into the recorded interactive video database, and wherein response to a second user request, the short duration interactive video introduction is retrieved from the recorded interactive video database and is communicated to the first electronic device of the requesting user.

16. The short duration interactive video introduction system of claim 1, further comprising:

a recorded interactive video database residing in a memory, wherein the central processing unit stores the short duration interactive video introduction into the recorded interactive video database, and wherein response to an unknown person of interest request generated by the electronic device of the unknown person of interest, the short duration interactive video introduction is retrieved from the recorded interactive video database and is communicated to the electronic device of the unknown person of interest.

17. A method for conducting a short duration interactive video introduction session between a requesting user and an unknown person of interest, comprising:

receiving a user request from an electronic device of the requesting user to conduct a short duration interactive video introduction with the unknown person of interest, wherein the unknown person of interest is identified as being a member of a social media site by the requesting user;

communicating a short duration interactive video introduction invitation to an electronic device of the unknown person of interest, wherein the short duration interactive video introduction invitation presents a selectable link that is presented on a display of the electronic device of the unknown person of interest;

communicatively coupling the electronic device of the requesting user and the electronic device of the unknown person of interest in response to receiving an acceptance of the short duration interactive video introduction invitation by the unknown person of interest;

conducting the short duration interactive video introduction between the requesting user and the unknown person of interest; and ending the short duration interactive video introduction session upon expiration of a predefined duration, wherein the predefined duration is a first selectable predefined duration that is selectable by the requesting user, and wherein a second selectable predefined duration that is selectable by the requesting user ends the short duration interactive video introduction session at the expiration of the second selectable predefined duration.

18. The method of claim 17, wherein the user request comprises:

first identity information that identifies the requesting user;

social media site identity information that identifies the social media site;

second identity information that identifies the unknown person of interest; and electronic device information that identifies the electronic device being used by the requesting user, wherein the short duration interactive video introduction invitation identifies the requesting user based on the first identify information, wherein the short duration interactive video introduction invitation is directed to the unknown person of interest based on the social media site information and based on the second identify information, and wherein the selectable link is generated based on the electronic device information.

\* \* \* \* \*